US009360857B2

(12) United States Patent
Rollet et al.

(10) Patent No.: US 9,360,857 B2
(45) Date of Patent: Jun. 7, 2016

(54) ELECTRICAL DISCHARGE MILLING MACHINE

(71) Applicant: AGIE Charmilles SA, Losone (CH)

(72) Inventors: Claude Rollet, Ornex (FR); Claudio Tricarico, Nyon (CH); Jean-Claude Diot, Entremont (FR); Roger Delpretti, Vernier (CH)

(73) Assignee: AGIE Charmilles SA, Losone (CH)

( * ) Notice: Subject to any disclaimer, the term of this patent is extended or adjusted under 35 U.S.C. 154(b) by 327 days.

(21) Appl. No.: 14/154,851

(22) Filed: Jan. 14, 2014

(65) Prior Publication Data
US 2014/0200708 A1      Jul. 17, 2014

(30) Foreign Application Priority Data
Jan. 17, 2013   (EP) .................................. 13151562

(51) Int. Cl.
| | |
|---|---|
| *G05B 19/18* | (2006.01) |
| *B23H 7/18* | (2006.01) |
| *G02B 6/00* | (2006.01) |
| *B23H 7/20* | (2006.01) |
| *B23H 1/02* | (2006.01) |

(Continued)

(52) U.S. Cl.
CPC ................ *G05B 19/182* (2013.01); *B23H 7/18* (2013.01); *B23H 7/20* (2013.01)

(58) Field of Classification Search
CPC ........... B23H 7/18; B23H 7/20; B23H 1/022; B23H 9/02; B23H 1/02; G05B 19/182; G06F 19/00; B23Q 11/0891
USPC ..................... 385/147; 700/98, 162; 409/137; 219/69.15, 69.16
See application file for complete search history.

(56) References Cited

U.S. PATENT DOCUMENTS

| | | | |
|---|---|---|---|
| 3,286,127 A | * | 11/1966 | Henry .................... B23H 1/022 219/113 |
| 5,354,961 A | | 10/1994 | Diot et al. |

(Continued)

FOREIGN PATENT DOCUMENTS

| | | |
|---|---|---|
| EP | 0555818 A1 | 8/1993 |
| EP | 1238740 B1 | 5/2008 |

OTHER PUBLICATIONS

Philip Bleys: "Electrical Discharge Milling: Technology and Tool Wear Compensation", Thesis, Dec. 2003, XP002700253, Leuven.

(Continued)

*Primary Examiner* — Akm Enayet Ullah
(74) *Attorney, Agent, or Firm* — Bachman & LaPointe, P.C.

(57) ABSTRACT

The invention relates to electrical discharge milling machines using tool electrodes subject to longitudinal wear. The inventive discharge milling machine is equipped with a numerical controller executing at least one control cycle for compensating the wear considering the following steps:
(a) determining the volume Q eroded by each discharge,
(b) calculating the distance s travelled by the tool from one effective discharge to the next,
(c) calculating the actual eroded linear volume M [$m^3/m$] for at least one effective discharge, M forming a measurement sample from the values Q and s,
(d) comparing said sample M with the corresponding set value C to generate an error D=C−M [$m^3/m$], and
(e) calculating and transmitting a command by the numerical controller intended to reduce this error D during the following cycle or cycles.

19 Claims, 1 Drawing Sheet

(51) Int. Cl.
*B23H 9/02* (2006.01)
*B23H 3/04* (2006.01)
*B23Q 11/08* (2006.01)
*B23Q 11/00* (2006.01)
*G06F 19/00* (2011.01)

(56) References Cited

U.S. PATENT DOCUMENTS

| | | | |
|---|---|---|---|
| 6,642,470 B2 | 11/2003 | Tricarico et al. | |
| 2007/0239311 A1* | 10/2007 | Gasparraj | B23H 7/22 700/162 |
| 2011/0174634 A1* | 7/2011 | Cabrera | B23H 3/04 205/645 |
| 2015/0298231 A1* | 10/2015 | Mraz | B23H 1/04 219/69.15 |
| 2015/0336230 A1* | 11/2015 | Koike | B23Q 1/015 409/137 |
| 2015/0367436 A1* | 12/2015 | Hiraga | B23H 7/06 700/162 |

OTHER PUBLICATIONS

P. Bleys et al: "Sensing and compensation of tool wear in milling EDM", Journal of Materials Processing Technology, vol. 149, No. 1-3, Jun. 1, 2004, pp. 139-146, XP055068388, ISSN: 0924-0136, DOI: 10.1016/j.jmatprotec.2003.11.042.

Bissacco G et al: "Towards the effective tool wear control in micro-EDM milling", The International Journal of Advanced Manufacturing Technology, Springer, Berlin, DE, vol. 47, No. 1-4, May 2, 2009, pp. 3-9, XP019797772, ISSN: 1433-3015.

* cited by examiner

ELECTRICAL DISCHARGE MILLING MACHINE

BACKGROUND OF THE INVENTION

The present invention relates to an electrical discharge milling machine using tool electrodes of elongate shape and of constant cross section, said tools carrying out the machining at their ends and being subject to longitudinal wear, said machine being equipped with:
 (a) an erosive discharge generator,
 (b) a rotating spindle with a mandrel,
 (c) a numerical controller (NC),
 (d) a set of motorized axes controlled by the numerical controller,
 (e) a device for measuring the length of the tool outside the machining process,
 (f) a tool path generator (CAD/CAM system) interfaced with the numerical controller, which can be used to divide the workpiece into a stack of successive layers and define one or more paths for the sweep of the tool in each layer, and
 (g) a post-processor acting as a set value generator, interfaced with the numerical controller or integrated therein.

The tools normally used for electrical discharge milling are tubes, or less commonly cylinders. However, because the tool is made to rotate, it is possible to use any type of tool having a constant cross section, including, for example, a square or rectangular cross section.

The electrical discharge milling method is a well-known variant of EDM machining, documented in depth in the thesis by Philip Bleys, "Electrical Discharge Milling: technology and tool wear compensation", Université Catholique de Louvain, December 2003.

To achieve acceptable precision in the machined workpiece, the electrical discharge milling method requires continuous compensation for the wear of the electrode tool. Given that the shape of the tool end is normally unvarying, its wear can be compensated for in a single dimension, in other words incrementally along its axis of symmetry which is generally identical to the Z axis of the machine.

A tested method is that of including compensation commands in the program which describes the tool path. The term "anticipated corrections" is generally used in this case, as the corrections are determined in advance. These corrections are made in the form of an inclination or gradient of the tool path, such that the tool penetrates into the workpiece as it advances on its path. This method of anticipated compensation is supplemented by periodic measurements of the actual length of the tool outside the machining process, using a reference sensor; by this means it is possible to measure the length of the tool outside the machining process, to check that the programmed wear matches the actual measured reduction in length, and to make corrections.

The machine is connected to a CAD/CAM system which is a program having the function of dividing the workpiece into superimposed layers and generating tool paths for the numerical controller (NC) at each layer. Between the CAD/CAM system and the NC it is generally necessary to implement a post-processor program having the function of introducing into the machining program the appropriate technological parameters for the electrical discharge milling machine, together with the nominal or limit speeds of tool advance. In some embodiments, the post-processor can be incorporated into the NC. On the basis of the information from the CAD/CAM system, the post-processor executes a preliminary simulation of the machining process, in which, notably, the points at which the material has not yet been machined are identified, the volumes of material still to be machined are predicted, and the corresponding wear on the tool is calculated according to a more or less precise model.

This method is subject to a drawback to which Bleys proposes a solution; see, notably, Figure 6.52 of Section 6.9.3 of the document cited above. The unmachined workpiece must be described by a very precise geometrical model, using the CAD/CAM program. Bleys proposes a device for stopping the wear compensation when the tool enters a void in the material which is not identified in the CAD/CAM program.

The original combined compensation device developed by Bleys includes a first "real time" branch and a second "anticipated" branch. When the real time branch is activated, it counts the effective discharges occurring within a time interval sequenced by a clock, and immediately applies wear compensation to the tool in proportion to the recorded number.

The anticipated branch makes available a sequence of compensation gradients determined according to a program. These gradients can be applied in succession to precise curvilinear abscissas defined in advance along the whole path.

Using the combined method of Bleys, the calculations are performed simultaneously in both the real time and the anticipated branch, but only one of the two generates the compensation command, on the basis of a comparison of the two results.

It is desirable for the real time branch to generate compensation commands continuously. The real time branch does not hand over control to the anticipated branch unless the former sends a higher compensation command than the second. The real time branch serves, notably, to detect movements of the tool in voids in the material which were not identified in advance, and to stop the compensation. The real time branch is the improvement proposed by Bleys which makes it possible, notably, to detect movements of the tool in voids in the material which were not identified in advance, and to stop the compensation. However, this entails a constant risk of drift if the system allows the smallest difference between the measurement of the wear and the compensation for it. To reduce this risk, the anticipated branch acts as a safety barrier and prevents the accidental downward drifts that are intrinsic to the real time branch.

In the Bleys system, therefore, we find a real time branch having temporal sequencing and an anticipated branch having spatial sequencing; the wear correction is directly injected at the Z axis which is also sequenced by a clock.

However, this method has a drawback, in that, if the wear parameters are selected incorrectly, the system may become blocked in the anticipated branch, because the two branches operate according to an evaluation of the wear on the tool and it is known that this wear can vary dramatically according to the machining conditions. See Bleys, Section 4.6. A solution to this problem has been proposed in the patent EP1238740B1, but the method described therein is complicated and costly. Consequently the drawbacks due to the variability of the wear on the tool persist.

On the other hand, Figure 3.18 of Section 3.5.2 of the Bleys document illustrates another problem which has not been satisfactorily resolved in the case in which the geometrical model of the unmachined workpiece has not been fully worked out in the CAD/CAM program. This problem concerns the risk of cumulative deformation of the end of the tool beyond the thickness of the layer, in a case where it has insufficient, but not zero, engagement with the material in a prolonged stroke; in this case, the overlap $Z_L$ between the workpiece and the tool is too small and the wear on the tool ceases to be uniformly distributed over its radius.

SUMMARY OF THE INVENTION

The object of the present invention is to propose a solution to the drawbacks described above. For this purpose, the electrical discharge milling machine is characterized in that the post-processor generates a file of set values C [m$^3$/m] equivalent to a set linear volume which is to be eroded from the workpiece per unit of length of the tool stroke, interacting with a first controller which executes a repetitive control cycle composed of at least the following steps:
  (h) evaluating the volume Q eroded by each discharge,
  (i) calculating the distance s travelled by the tool from one effective discharge to the next,
  (j) calculating the actual eroded linear volume M [m$^3$/m] for at least one effective discharge, M forming a measurement sample,
  (k) comparing said sample M with the corresponding set value C to generate an error D=C−M [m$^3$/m], and
  (l) calculating and transmitting a command intended to reduce this error during the following cycle or cycles.

The first step in the control cycle claimed by the invention is to evaluate the volume Q eroded by each discharge. Numerous experiments have been conducted since the introduction of electrical discharge milling in order to determine the effectiveness of each type of discharge. See, for example, patent CH562080. See also Bleys, Section 4.3.2 and Appendices A: "Pulse analysis and pulse classification". Using technological tests, tables have been drawn up, showing the volume of material Q eroded per type of discharge. Electrical discharge milling provides a further advantage: since the tool is kept rotating rapidly, the particle removal in the gap is accelerated, resulting in a notable regularity of erosive power in each discharge. The reliability of the method is further improved by using constant energy discharges. For practical purposes, this means that the number of discharge categories can be reduced to two, namely effective discharges and short circuits. No material is removed by the latter.

The second step in the control cycle is that of calculating the distance s travelled by the tool from one effective discharge to the next. To find the time interval T between two successive effective discharges, it is simply necessary to record the difference between the moment when a first effective discharge took place and the moment when the next effective discharge took place. There is also a known way of calculating the actual speed $V_R$ at which the tool advances on its path, using a vector calculation based on the measured speeds of each motorized axis of the machine. Then the product $T \cdot V_R = s$. The next steps in the control cycle are known to persons skilled in the art and require no detailed explanation.

To enable this procedure to be used, it is advantageous for the file of set values C [m$^3$/m] to contain at least one sequence of values associated with curvilinear abscissas on the path. Section 3.6, page 58, of the Bleys document provides a full description of the information to be included in said set value file or program.

For each step of machining in the form of a tool path, a file is generated, containing all the necessary processing parameters. The contents of this file include, for example, a sequence of horizontal movement vectors, as well as tool wear compensation vectors, the latter being optionally added to the vertical movements. Figure 3.25 of Section 3.6 of the Bleys document shows an example of a program line in which the command labelled CM is a direct command for tool wear compensation, expressed in units of one millimeter. The present invention proposes to replace this command CM with a set linear volume C [m$^3$/m] which is to be machined in the workpiece, expressed in units of one cubic meter per meter.

A file of set values C [m$^3$/m] is normally generated resp. calculated with the post-processor, on the other hand these values C could also be pre-measured or extracted from a database etc.

This procedure very advantageously enables the method to be independent of the variations of wear on the electrode tool. Following numerous technological tests, it has been found that the removal of material from the workpiece by each type of erosive discharge is remarkably constant, regardless of the machining conditions. It is known that this is not the case for the removal of material, or wear, on the electrode tool. Therefore, by basing the control of the method on a linear volume to be machined by the tool in the workpiece, it is possible, as described below, to compensate for its wear in a precise way, regardless of the variations of this wear.

The sequencing of the wear controller, according to the invention, is determined by passage through fixed or variable increments of length, or path intervals; it is therefore exclusively spatial. Consequently, if the precision of the machining is of primary importance and the calculation rates are too high, it is possible to reduce the speed of advance of the tool as required, without adversely affecting the results, because these do not depend on the calculation times; this is a notable advantage.

Conversely, the adjustment of the machining gap may become critical at high speeds of advance. In the first embodiment of the invention, therefore, a second controller dedicated to the adjustment of the machining gap is made to control a speed of advance of the tool $V_a$ [m/s] on its path around a set value $V_c$ [m/s]. This adjustment is carried out according to the value of the average delay on initiation of the discharge. A short delay leads to deceleration, and vice versa. In some cases, the set value $V_c$ [m/s] can be applied directly without real time control; the tool will then advance at constant speed. However, in this simplified embodiment there is a risk of collision with unidentified obstacles.

The tool wear compensation vectors which are added to the vertical movements, according to Bleys (Figure 3.25, cited previously), appear on each line of the program. Because of a claimed feature of the invention, it is desirable to avoid this redundancy and to allow the first controller, advantageously, to process the set values received from the post-processor by keeping them constant between two successive curvilinear abscissas, or by making an interpolation from one curvilinear abscissa to the next, any kind of interpolation being feasible. This advantageously reduces the volume of data contained in the file or program generated by the post-processor.

To compensate for its wear, the tool, during its horizontal movement, penetrates into the workpiece by larger or smaller increments of length, at the risk of leaving undesired marks on the surface of the machined workpiece. It is important to be able to minimize these marks and thus to adjust the compensation increment to the requirements of each execution according to an appropriate tolerance level. Clearly, therefore, the first controller can generate a longitudinal tool wear compensation command as soon as the error D=C−M [m$^3$/m] exceeds a given tolerance which can be as small as desired.

For doing so, the numerical controller can calculate and transmit a command intended to reduce this error D during the following control cycle or cycles. The command intended to reduce this error D and thus to compensate the tool wear can be implemented in different ways. It can be a positioning or speed command or a command affecting the pulse frequency or a combination thereof. Preferably the command is directed to the set of motorized axes. The command can result for instance either in the movement of the electrode or of the part. In a further embodiment, the command could let the electrode be deformed or sided through its holder.

If the operation of the first controller according to the invention is observed, it will be seen that its main function is to copy the geometry of the workpiece to the next layer without amplifying any flatness errors therein. To achieve this, it is preferable for said controller to be able to execute at least two control cycles, namely a measurement of the error followed by the correction of the error, before the tool has left its current location. It is therefore advantageous for the first controller to execute at least one control cycle when the tool has covered a distance on the path which is smaller than the tool rotation diameter, and preferably smaller than its rotation radius. This measurement is possible even for very small diameter tools, because the calculation rates have no effect on the results, as mentioned above.

The distance s travelled by the tool from one effective discharge to the next is an essential parameter for the operation of the first controller. It is even feasible to execute one control cycle for each spark: this is the smallest unit of control that can be envisaged. The drawback is that this distance s is not constant, and therefore the implementation is relatively complicated. To provide a more precise result, it is preferable for the first controller to calculate the sum of volumes eroded in the workpiece $\Sigma Q$ over a portion of path, or path interval, $P_T$ [m], including at least one control cycle, and to produce a measurement sample M [m$^3$/m] equivalent to the actual volume eroded on said portion of path. In this case, Q is replaced by the sum of the volumes $\Sigma Q$ and s is replaced by the sum of the distances $\Sigma d$, and M=$\Sigma Q/\Sigma d$. Additionally, if constant energy discharges are used, the evaluation of the volumes eroded in the workpiece $\Sigma Q$ is simplified and can be summarized as counting the effective discharges on said portion of path.

Another advantageous simplification is to segment the tool path into fixed increments or intervals of the path $P_T$ [m] and to execute one control cycle per path interval.

The invention includes two distinct modes of execution which differ from each other in the specific operations of the first controller and of a second controller which interacts with the first. The type of command generated by the first controller, with the aim of reducing the error D=C−M, differs from one mode to the other. The second controller, present in both modes, is intended to control the machining gap; it also operates in a different way from one mode to the other.

The first mode is particularly suitable for machining thick layers, whereas the second is preferable for machining thin layers. Said thick layers have a minimum to maximum thickness range which typically lies between the value of the machining gap and the tool radius. Layers described as thin are smaller than or equal to the machining gap.

In the case of the first mode of execution, the first controller calculates, in each control cycle, a longitudinal tool wear compensation command W such that W[m]=F(M,D)·Uo, where F(M,D) is a function of the measurement sample variable M and the error variable D=C−M and where Uo [m/m$^3$] is a coefficient called 'Longitudinal tool wear'. Advantageously, the function F(M,D) can be stated in a very simple form with a conventional control function of the PID type, using for example a generic expression:

$$F(M,D)=k_1 \cdot M + k_2 \cdot D + k_3 \cdot \Delta D + k_4 \cdot \Sigma D$$

where the variable M is an a priori command, D=C−M is an error variable, $\Delta D$ is the differential of the latter, $\Sigma D$ is its sum, and $k_1, k_2, k_3, k_4$ are coefficients, where preferably $k_1=1$.

According to the usual methods, provision must be made to reset $\Sigma D$ to zero, notably if the set value C changes.

As regards the first mode of execution, the machining gap is controlled by a second controller which sets a speed of advance $V_a$ [m/s] of the tool around a set value $V_c$ [m/s] supplied by the file generated by the post-processor, as documented by Bleys in Section 4.2.2.

In the expression W[m]=F(M,D)·Uo, the coefficient Uo does not necessarily have to be exact. This remarkable property is particularly advantageous in that it makes it unnecessary to store tables of process values of tool wear or to implement complex strategies for segmenting the tool strokes (see Section 6.5.3 in Bleys and the previously cited document EP1238740B1). Within a few control cycles, the function F(M,D) will correct the error caused by an approximate value of Uo.

If the coefficient Uo is unknown, machining can be started with this coefficient set to zero; in other words, machining can take place for a short time without tool wear compensation. After a longer or shorter stroke, the tool will escape from the workpiece and cease to machine it. It will have lost a length equal to the thickness Ec of the layer. It is then simply necessary to record the volume of material $\Sigma Q'$ machined from the workpiece during the period and to find the quotient Ec/$\Sigma Q'$ in order to obtain a first evaluation of the coefficient Uo.

For the rest of the machining operation, the knowledge of the coefficient Uo can be refined further by using the device for measuring the length of the tool outside the machining process. In any stroke, the machining is interrupted at the start and end of the stroke, for the purpose of making two measurements of the actual length of the tool; the volume of material $\Sigma Q'$ machined from the workpiece during the period concerned is recorded. It will then be seen that the first controller can calculate a substitution coefficient Uo [m/m$^3$], using a quotient Lw/$\Sigma Q'$, where Lw is the length of the tool that has been consumed, measured by the device for measuring the tool length outside the machining process, and $\Sigma Q'$ is the sum of volumes eroded from the workpiece when the tool has covered the portion of the path which resulted in said wear Lw.

In an even more advantageous way, the knowledge of the coefficient Uo can be refined without interrupting the machining. This operation can be performed continuously by the first controller, by recording a sufficient number of regulation cycles and simultaneously finding both the sum $\Sigma W$ of the compensations W and the sum $\Sigma Q'$ of the eroded volumes. It will also be seen that the first controller can calculate a substitution value of the coefficient Uo [m/m$^3$] using a quotient $\Sigma W/\Sigma Q'$, where $\Sigma W$ is the sum of the longitudinal tool wear compensations executed on a given portion of the path and $\Sigma Q'$ is the sum of the volumes eroded from the workpiece when the same portion of path has been covered. When these calculations have been completed, the first controller can update the coefficient Uo if necessary in the relation W[m]=F(M,D)·Uo.

As mentioned above, the CAD/CAM system performs a preliminary simulation of the machining operation, identifying the locations where the material remains as the tool progresses. The workpiece before machining must therefore be described precisely and fully in the CAD/CAM software. If the description of the geometry of the workpiece is inexact or incomplete, a variant of the first embodiment of the invention is provided, in order to prevent the tool, for example, from sinking into the workpiece if it passes through an unidentified void in the material. In the converse situation, since the machining takes place in successive layers, it does not appear possible for the tool to encounter unidentified obstacles having a thickness greater than that of one layer. However, as the wear compensation may be stopped in certain conditions, it is possible that residues of material may be left in place locally when a layer is machined. Provision must therefore be made for the possibility that the tool will encounter unidentified local excesses of material, with a thickness approximately equal to that of one layer in addition to the machined layer.

The first controller can detect the occurrence of a lack of material when the error D=C−M exceeds a positive threshold equal to a fraction of the layer thickness. Conversely, the occurrence of an excess of material can be detected when the error D=C−M falls below another threshold which is of the same order of magnitude but which is negative. Above and below the window defined by these two thresholds, it would evidently be advantageous to replace the relation W=F(M,D)·Uo with W=$k_1$·M·Uo. Thus, if the tool encountered an unidentified void in the material, the compensation would be halted even if the set value C was other than zero. Conversely, if the tool encountered an unidentified excess of material, the compensation would be increased above the level required by the set value C. This effect is achieved by forcing the error variable D to zero in the function F(M,D) if D falls outside a tolerance window around zero. In this case, for example, said function is reduced to $k_1$·M. Conversely, if the error variable D falls within said window, in other words within a region close to zero, then the same function F(M,D)=$k_1$·M+$k_2$·D+$k_3$·ΔD+$k_4$·ΣD is kept constant.

The method is similar to that proposed by Bleys, with the difference that, according to the invention, the sequencing of the first controller is spatial in all cases. This considerably reduces the tendency to drift when the error variable D is forced to zero in the function F(M,D).

Concerning another aspect, since the numerical controller (NC) is sequenced by a clock, the command W cannot be transmitted to it without an adaptation according to the following example:

when the second controller has generated a speed of advance command $V_a$ [m/s], the first controller calculates the wear compensation W[m] per path interval $P_T$ [m] and transmits to the NC a speed command $V_w$ [m/s]=$V_a$·W/$P_T$ intended to compensate for the tool wear, $V_w$ being exclusively positive. Thus the NC receives a temporal command which can be applied generally to the Z axis or to a combination of axes. The example above describes the formation of a speed command; clearly, a position command can be calculated in a similar way.

When the first controller operates outside said tolerance window, the tool ceases to follow the geometry of the workpiece left by the machining of the preceding layer. If the coefficient Uo is exact, or if it has been possible to update it in advance, the end of the tool immediately follows a rectilinear path over a distance which is normally sufficient to achieve an engagement permitting a return to the window.

In cases where D=C, that is to say the engagement is zero, there is clearly no risk of drift, regardless of the length of the tool stroke in the void. The critical phases are those in which the controller operates outside the window and the engagement is not zero. It is preferable for these phases to be as short as possible. The reference distance, from this point of view, is that which is travelled by the tool when the wear causes a degree of shortening equal to the thickness of the layer, or "space constant of the tool". Consequently, in order to ensure the precision of the machining, it is advantageous, if the machining takes place with D outside said window over a path length greater than the space constant of the tool, to interrupt the machining for the performance of a tool length measurement cycle and for the repositioning of the tool at the exact height of the layer being machined.

Another critical phase is illustrated in Figure 3.18 of Section 3.5.2 of Bleys. In these conditions, the lateral engagement $Z_L$ between the tool and workpiece is insufficient to cause the wear to be distributed uniformly over the end of the tool, giving rise to a risk of cumulative deformation if the same conditions persist over an excessively long stroke. The insufficiency of $Z_L$ can be detected by the measurement M. It is therefore advantageous to arrange for the first controller to force the wear compensation W to zero if M<Lim1 over a stroke>P, where Lim1 and P are magnitudes corresponding to a risk of deformation of the tool. Thus the tip of the tool will remain at the height of the layer being machined. The drawback is that the tool will leave excess material after its passage, and this material will have to be removed with the next layer. As mentioned above, however, the first controller has been designed to withstand a limited excess of material. Furthermore, the sweep paths normally cross over from one layer to the next, and therefore the same fault will not be reproduced over a plurality of layers.

In a second embodiment of the invention, the second controller dedicated to the actual machining gap causes the tool to advance and withdraw in a direction close to its axis, this movement also providing compensation for the wear on the tool. In practice, the gap controller chosen for the second embodiment of the invention is characterized by a mode of operation which differs considerably from the first embodiment. However, this mode of operation is well known to persons skilled in the art. In fact, this controller is a conventional gap controller, similar to the type commonly used for orbital or planetary machining, as documented by Bleys in Section 2.3.1. In the second embodiment, therefore, the second controller generates a positive or negative speed command $V_w$ [m/s] for the purpose of opening or closing the gap between the tool and the workpiece in a direction which is more or less perpendicular to the workpiece.

In the case of thin layers, it is highly advantageous to use this type of gap control. On the surfaces of sufficiently flat workpieces, it becomes possible to achieve high sweep speeds without any risk of spark extinction or short circuit. This performance is difficult to achieve with devices according to the first embodiment. It is well known that an orbital controller of this type keeps the mean spark ignition delay $T_d$ constant, while automatically compensating for the tool wear. The problem of wear is thus resolved in a simple and effective way. However, the surface spark density is not controlled, and, since machining is carried out layer by layer, there will inevitably be an accumulation of geometrical errors. It is therefore equally advantageous, in this specific embodiment, to control the linear set volume to be eroded per unit of length of tool stroke. This object is achieved in the following manner: according to the value of the error D, the first controller sends to the machining generator a command ΔF intended to modify the frequency of the erosive discharges in such a way that the frequency increases if D>0 and decreases if D<0. Thus the first controller can act in a calibrated manner such that the machining is more or less intensive depending on the momentary location of the tool.

The corrective feedback is virtually immediate if the duration of the pause between discharges is adjusted. It is also possible to act in a more moderate way by modifying the mean spark ignition delay. The pause duration and the spark ignition delay are factors which can be used directly for varying the spark frequency and consequently the machining power. The feasible control functions are known to those skilled in the art and can be implemented in widely varying ways.

The high responsiveness of the first controller in this embodiment is particularly appropriate for the speeds of advance that can be achieved, namely 10 to 20 mm/s. The set value file must therefore include commands for deceleration on approaches to changes of direction, this deceleration leading to automatic commands to reduce the spark frequency via the first controller, and vice versa.

At these speeds, the characteristics of the second controller are such that the profile of the workpiece can be followed as precisely as possible, provided that said profile is not too irregular. If the surface of the workpiece includes voids in the material or abrupt obstacles, there will still be a risk of collision and destruction of the tool.

BRIEF DESCRIPTION OF THE DRAWINGS

With the aid of the drawings, other advantageous characteristics will be made clear in the following detailed explanation of the invention.

DETAILED DESCRIPTION

Figure 1:
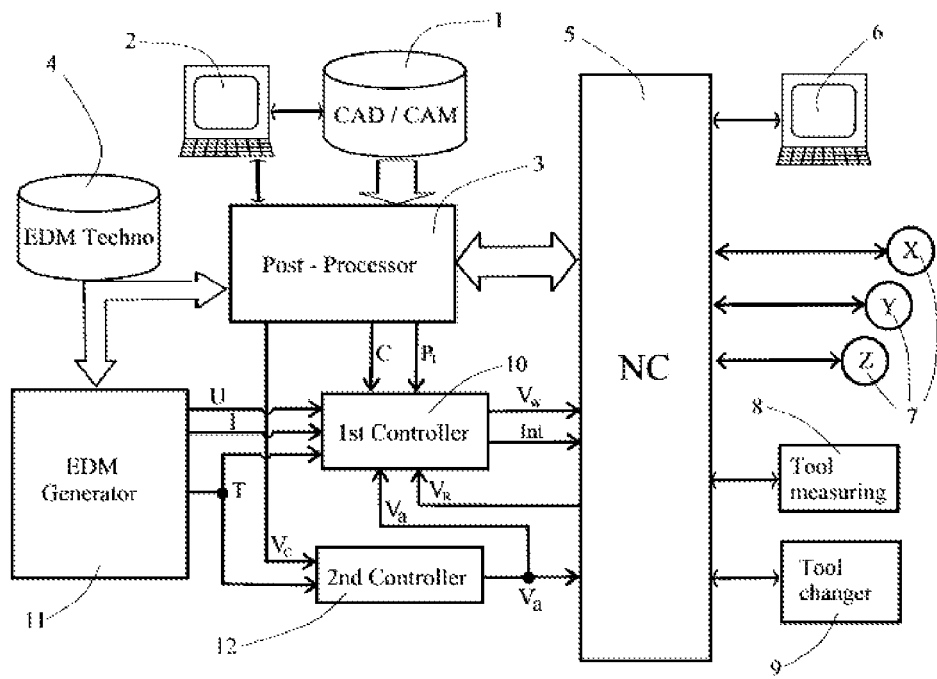
FIG. 1 is a simplified block diagram showing a first embodiment of the electrical discharge milling machine.

The block diagram of FIG. 1 shows the symbols for the essential components of the electrical discharge milling machine tool according to the invention. The CAD/CAM system 1 and its programming station 2 form a computerized tool enabling the machine operator to define the geometry of the workpiece to be machined and to convert a cavity into a sequence of layers. Each layer is itself segmented into regions or zones, within which the CAD/CAM system 1 defines a sweep or programmed path composed of a sequence of linear segments. At the programming station 2, the operator is invited to choose the types of tool to be used, with their associated parameters and the machining modes. He decides on the thicknesses of the layers to be machined and the roughness of the finished surface. Thus a machining range is defined by a certain number of files transmitted to the post-processor 3. The post-processor receives the mode tables containing the set of machining parameters from an EDM technology database 4. The programmed paths and their associated parameters are transmitted to the NC 5 via the post-processor 3, and include, notably, the coordinates of the point of arrival of the next linear path segment to be executed. The operator controls the machine tool with the aid of the programming station 6. The NC 5 controls the motorized axes 7 of the machine; these axes return position and speed data to the NC 5. For simplicity, the drawing shows only three linear axes X, Y, Z; however, machines including, for example, other rotation axes can benefit from the invention. The NC 5 also controls a device for measuring the length of the tool outside the machining process 8, and a tool changer 9.

The post-processor 3 defines the parameters of the electrical discharge milling generator 11. For simplicity, the drawing does not show the tool machining the workpiece, nor their connections to the electrical discharge milling generator 11. The mechanical devices which cause the tool to move relative to the workpiece by means of the motorized axes 7 are also omitted from the drawing.

In order to execute the first step of the control cycle claimed by the invention, the first controller 10 receives from the electrical discharge milling generator 11 the signals for the discharge current I and discharge voltage U, which are analysed to enable the volume Q eroded by each discharge to be determined. The values for the volume Q eroded by each discharge are preferably predetermined and stored in the EDM technology database 4, or computed resp. calculated as a function of the discharge current I and other relevant process parameters. In a variant embodiment which is not shown, it would be possible to perform said signal analysis within the electrical discharge milling generator 11, which would then deliver the data Q directly to the first controller 10.

The second step of the control cycle, namely the calculation of the distance $s=T \cdot V_R$ travelled by the tool from one effective discharge to the next, is performed by the first controller 10, using the data T and $V_R$ which are transmitted to it by the electrical discharge milling generator 11 and by the NC 5. The value of the time T between two successive discharges is added to the preceding value if the discharge taking place is a short circuit. The data element $V_R$ is the actual speed of advance of the tool along its path, and is calculated by the NC 5 according to the movements of each motorized axis.

The next steps of the claimed control cycle are also executed by the first controller 10. In particular, the 'linear set volume' data element C [m³/m] must be transmitted to the first controller 10 by the post-processor 3 for the calculation of the error D=C−M [m³/m]. The post-processor can move from one set value to the next by using the data which it receives in return from the NC 5 when a segment of the path has been completed. The first controller 10 carries out the necessary interpolations between two successive set values.

Because the NC 5 is sequenced by a clock, the first controller 10 does not transmit the wear compensation command W directly to it, but calculates an exclusively positive compensation speed $V_w$ [m/s]=$V_a \cdot W/P_T$, which the NC causes to be executed by one or more motors, depending on the architecture of the machine. For this purpose, the first controller 10 receives, on the one hand, the 'path interval' data element $P_T$ [m] from the post-processor 3. Provision must be made for cases where $P_T$ is not constant. The first controller 10 receives the data element $V_a$ required for the calculation of $V_w$, from the second controller 12. The latter ensures that the machining does not enter a state of spark extinction or short circuit, by controlling the speed of advance $V_a$ of the tool along its path around a set value $V_c$ which it receives from the post-processor 3. The data element T transmitted by the electrical discharge milling generator 11 to the second controller 12 tells the latter whether the machining gap is tending to close or open, enabling it to reduce or increase the speed of advance $V_a$. In this embodiment, the 'speed of advance of the tool' command $V_a$ enables the first controller 10 to adapt the wear compensation speed $V_w$ in a correlated way, as described above.

Various values of thresholds or tolerances have been mentioned. They can be used to define a window outside which the error variable D is forced to zero in the control function, or to interrupt the machining for the purpose of direct measurements of the tool. For simplicity, the corresponding data elements have not been shown in the drawing. Clearly, these data elements travel from the post-processor 3 to the first controller 10, which transmits interruption commands to the NC 5 in order to make the latter give the command for the tool measurement operation 8 if necessary. If the machining takes place with D outside said window over a path length greater than the space constant of the tool, the first controller (10) interrupts the machining with the signal Int to make the NC (5) execute a tool length measurement cycle.

Figure 2:
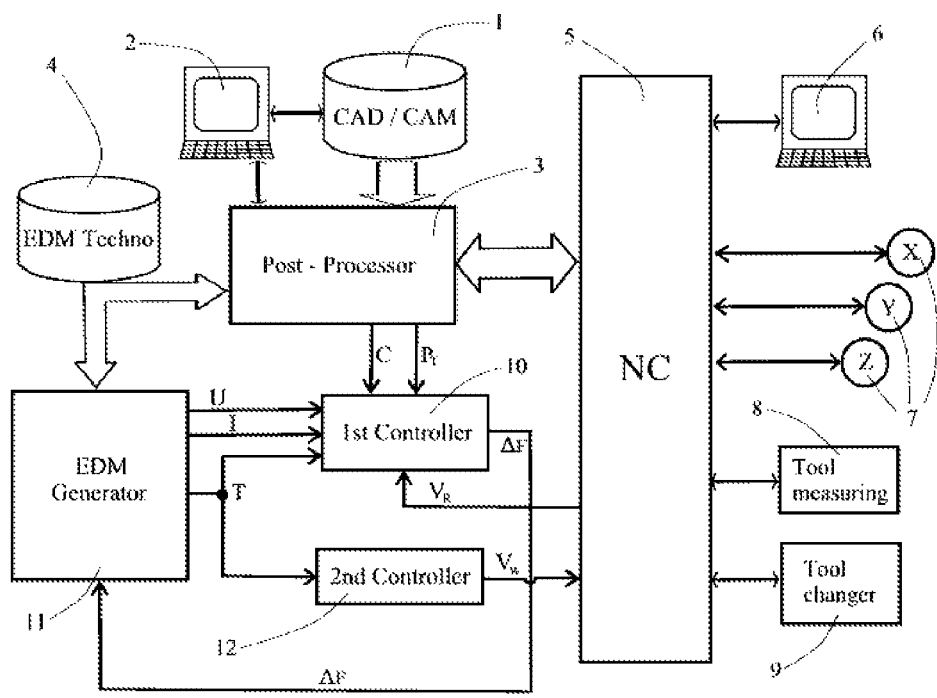
FIG. 2 is a simplified block diagram showing a second embodiment of the electrical discharge milling machine.

FIG. 2 illustrates the second embodiment of the invention; it is similar to FIG. 1, with two main differences, namely:

On the one hand, the tool wear compensation command $V_w$ is sent from the second controller 12. In this case, the speed $V_w$ is positive or negative, as is usual for a conventional electrical discharge machine in which the electrode advances and withdraws in order to keep the machining in progress. Thus the machining gap and the wear compensation are controlled simultaneously. The speed of advance along the path $V_a$ is no longer required, as it is equal to the set speed Vc; the latter data element is transmitted directly from the post-processor 3 to the NC 5.

On the other hand, the first controller 10, which has the function of calculating and transmitting a command for reducing the error D, generates in this mode a command $\Delta F$ for modifying the frequency of the erosive discharges. The data element $\Delta F$ is therefore sent to the electrical discharge milling generator 11.

Clearly, the embodiments and variants described above are not in any way limiting and can be modified in any desired way within the scope defined by the independent claim. For example, the speed commands or set values can be replaced by position commands or set values. If constant energy machining modes are used, the set linear volumes can be replaced by set values expressed in numbers of discharges. Some functions assigned to the post-processor can be implemented in the NC. Some functions assigned to the first controller can be distributed in the EDM generator or in the NC, and so on.

KEY TO THE NUMBERING ON THE DRAWINGS

1) CAD/CAM tool path generator
2) CAD/CAM programming station
3) Post-processor
4) EDM technology database
5) Numerical controller (NC)
6) NC programming station
7) Set of motorized axes controlled by the NC
8) Device for measuring the length of the tool outside the machining process
9) Tool changer
10) First controller
11) EDM generator
12) Second controller

The invention claimed is:

1. Electrical discharge milling machine comprising tool electrodes of elongate shape and of constant cross section, wherein the tool electrodes carry out machining at their ends and are subject to longitudinal wear, said machine being equipped with:
   (a) an erosive discharge generator,
   (b) a rotating spindle with a mandrel,
   (c) a numerical controller,
   (d) a set of motorized axes controlled by the numerical controller,
   (e) a device for measuring the length of the tool outside the machining process,
   (f) a tool path generator interfaced with the numerical controller, which divides the workpiece into a stack of successive layers to be machined and define one or more paths for the sweep of the tool in each layer, and
   (g) a post-processor acting as a set value generator, interfaced with the numerical controller or integrated therein;
   wherein the post-processor generates a file of set values C $[m^3/m]$ equivalent to the set linear volume which has to be eroded from the workpiece per unit of length of the tool movement on the path,
   interacting with a first controller which executes a repetitive control cycle composed of at least the following steps:
   (h) determining the volume Q eroded by each discharge,
   (i) calculating the distance s travelled by the tool from one effective discharge to the next,
   (j) calculating the actual eroded linear volume M $[m^3/m]$ for at least one effective discharge, M forming a measurement sample from the values Q and s,
   (k) comparing said sample M with the corresponding set value C to generate an error $D=C-M$ $[m^3/m]$, and
   (l) calculating and transmitting a command by the numerical controller intended to reduce this error D during the following cycle or cycles.

2. Electrical discharge milling machine according to claim 1, wherein the file of set values C $[m^3/m]$ contains at least one sequence of values associated with curvilinear abscissas on the path.

3. Electrical discharge milling machine according to claim 2, wherein the first controller processes the set values received from the post-processor and either (1) keeps them constant between two successive curvilinear abscissas, or (2) makes an interpolation from one curvilinear abscissa to the next.

4. Electrical discharge milling machine according to claim 1, wherein the first controller generates a command to reduce the error $D=C-M$ $[m^3/m]$ as soon as the latter exceeds a desired tolerance.

5. Electrical discharge milling machine according to claim 1, wherein the first controller executes at least one control cycle for compensating the wear when the tool has covered a distance on the path which is smaller than the tool rotation diameter.

6. Electrical discharge milling machine according to claim 1, wherein the first controller executes at least one control cycle for compensating the wear when the tool has covered a distance on the path which is smaller than the tool rotation radius.

7. Electrical discharge milling machine according to claim 1, wherein the first controller calculates the sum of volumes eroded in the workpiece $\Sigma Q$ over a portion of path, or path interval, $P_T$ [m], including at least one control cycle, and produces a measurement sample M $[m^3/m]$ equivalent to the actual volume eroded in said portion of path.

8. Electrical discharge milling machine according to claim 7, wherein the tool path is segmented into fixed increments or path intervals $P_T$ [m], the first controller executing a control cycle for each path interval.

9. Electrical discharge milling machine according to claim 8, wherein the first controller, in each control cycle, calculates a longitudinal tool wear compensation command W [m] such that $W=Uo*F(M,D)$ where F(M,D) is a function of a measurement sample variable M and an error variable $D=C-M$ and where Uo $[m/m^3]$ is a coefficient called 'Longitudinal tool wear'.

10. Electrical discharge milling machine according to claim 9, including a second controller, dedicated to the adjustment of the machining gap, controls a speed of advance of the tool $V_a$ [m/s] on its path around a set value $V_c$ [m/s].

11. Electrical discharge milling machine according to claim 10, wherein the first controller calculates a command similar to a speed command $V_w$ $[m/s]=V_a*W/P_T$ intended to compensate for the tool wear, where $V_a$ [m/s] is the advance speed command generated by the second controller, W [m] is the command sent by the first controller, and $P_T$ [m] is the path interval.

12. Electrical discharge milling machine according to claim 9, wherein the first controller calculates a substitution value for the coefficient Uo [m/m³], using a quotient Lw/ΣQ', where Lw is the length of the tool that has been consumed, measured by the device for measuring the tool length outside the machining process, and ΣQ' is the sum of volumes eroded from the workpiece when the tool has covered the portion of the path which resulted in said wear Lw.

13. Electrical discharge milling machine according to claim 9, wherein the first controller calculates simultaneously, over a given path portion, both the sum ΣW of the compensations W and the sum ΣQ' of the eroded volumes Q', and then calculates the quotient ΣW/ΣQ' which is a substitution value of Uo [m/m³].

14. Electrical discharge milling machine according to claim 12 or 13, wherein the first controller updates the coefficient Uo in the relation W[m]=F(C,D)·Uo.

15. Electrical discharge milling machine according to claim 9, wherein the first controller forces the error variable D to zero in the function F(M,D) if the error D falls outside a tolerance window around zero, whereas the control function F(M,D) is unchanged if the error D falls within said window.

16. Electrical discharge milling machine according to claim 15, wherein when the machining takes place with D outside said window over a path length greater than the space constant of the tool, the first controller interrupts the machining to cause a tool length measurement cycle to be executed, said space constant being the distance travelled by the tool which causes its wear to result in a shortening equal to the thickness of the layer.

17. Electrical discharge milling machine according to claims 15 and 16, wherein the first controller forces the wear compensation W to zero if M<Lim1 over a stroke greater than P, where Lim1 and P are magnitudes corresponding to a risk of deformation of the tool.

18. Electrical discharge milling machine according to claim 1, wherein a second controller dedicated to the machining gap adjustment executes an advance and withdrawal movement of the tool in a direction close to an axis of the tool, said movement providing compensation for the wear of the tool.

19. Electrical discharge milling machine according to claim 18, wherein, according to the value of the error D, the first controller sends to the machining generator a command ΔF intended to modify the frequency of the erosive discharges in such a way that the frequency increases if D>0 and decreases if D<0.

\* \* \* \* \*